(12) United States Patent
Lederle et al.

(10) Patent No.: US 10,589,361 B2
(45) Date of Patent: Mar. 17, 2020

(54) TOOL FOR ROUGHENING A BOREHOLE SURFACE

(71) Applicant: HILTI AKTIENGESELLSCHAFT, Schaan (LI)

(72) Inventors: Hans-Peter Lederle, Durach (DE); Michael Wiedemann, Koenigsbrunn (DE); Peter Ostermeier, Diessen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/761,460

(22) PCT Filed: Sep. 20, 2016

(86) PCT No.: PCT/EP2016/072240
§ 371 (c)(1),
(2) Date: Mar. 20, 2018

(87) PCT Pub. No.: WO2017/050730
PCT Pub. Date: Mar. 30, 2017

(65) Prior Publication Data
US 2018/0339347 A1 Nov. 29, 2018

(30) Foreign Application Priority Data
Sep. 23, 2015 (EP) ..................................... 15186465

(51) Int. Cl.
B23B 51/10 (2006.01)
B23Q 11/00 (2006.01)
(Continued)

(52) U.S. Cl.
CPC ........ B23B 51/0018 (2013.01); B23B 27/002 (2013.01); B23P 9/02 (2013.01);
(Continued)

(58) Field of Classification Search
CPC ........ B23B 29/03432; B23B 29/03457; B23B 51/0018; B23B 51/0045; B23B 2270/06;
(Continued)

(56) References Cited

U.S. PATENT DOCUMENTS 5,092,716 A * 3/1992 Omi ...................... B23D 59/025
408/204
5,234,294 A * 8/1993 Hoppe ................ B23B 51/0027
175/209
(Continued)

FOREIGN PATENT DOCUMENTS

DE 196 12 104 A1 10/1997
DE 20 2004 003332 U1 5/2004
(Continued)

*Primary Examiner* — Eric A. Gates
*Assistant Examiner* — Chwen-Wei Su
(74) *Attorney, Agent, or Firm* — Grüneberg and Myers PLLC

(57) ABSTRACT

A tool for roughening a borehole surface. The tool includes a coupling portion for clamping the tool; a tool head for machining the borehole surface; and an extraction duct. The coupling portion is disposed at a first end of a tool shank and the tool head at an opposite, second end of the tool shank. The tool head has a cutter disposed circumferentially on the tool heat The tool head has a slit, which passes through from one side to the other and which, starting from an end face of the tool head, extends axially along a longitudinal axis of the tool. The extraction duct extends at least partly axially along the longitudinal axis of the tool for extraction of drilling dust. The extraction duct, starting from the end face of the tool head, extends inside the tool shank and discharges circumferentially into a connecting opening in the tool shank.

20 Claims, 8 Drawing Sheets

(51) Int. Cl.
*B23B 51/00* (2006.01)
*B23B 27/00* (2006.01)
*B28D 1/14* (2006.01)
*B23P 9/02* (2006.01)

(52) U.S. Cl.
CPC .......... *B23Q 11/0046* (2013.01); *B28D 1/146* (2013.01); *B23B 2251/70* (2013.01); *B23B 2270/06* (2013.01); *B23B 2270/30* (2013.01); *B23B 2270/62* (2013.01)

(58) Field of Classification Search
CPC ........ E21B 10/003; E21B 10/60; E21B 21/01; E21B 21/015; E21B 11/005; B23Q 11/0046
USPC ......................................................... 175/213
See application file for complete search history.

(56) References Cited

U.S. PATENT DOCUMENTS

| | | | |
|---|---|---|---|
| 6,270,295 B1 * | 8/2001 | Hyatt | B23B 29/03457 408/1 R |
| 6,533,047 B2 * | 3/2003 | Kleine | B23B 51/06 173/198 |
| 6,604,894 B1 * | 8/2003 | Noggle | B23C 5/006 407/35 |
| 6,719,072 B2 | 4/2004 | Bongers-Ambrosius et al. | |
| 7,717,652 B2 * | 5/2010 | Weidmer | B23B 27/24 408/156 |
| 2008/0310930 A1 * | 12/2008 | Schaeffer | B23B 37/00 411/55 |

FOREIGN PATENT DOCUMENTS

| | | | | |
|---|---|---|---|---|
| EP | 0 068 227 A1 | 1/1983 | | |
| EP | 1 116 831 A1 | 7/2001 | | |
| EP | 2 848 341 A1 | 3/2015 | | |
| FR | 1068255 A * | 6/1954 | ............ | B23G 5/005 |
| FR | 1 116 686 A | 5/1956 | | |
| GB | 790483 A | 2/1958 | | |
| JP | 62-264238 | 11/1987 | | |
| JP | H10-278036 | 10/1998 | | |
| JP | 3107607 | 11/2000 | | |
| JP | 2002-142478 | 5/2002 | | |
| JP | 2002-283339 | 10/2002 | | |
| JP | 2005169517 A * | 6/2005 | | |

* cited by examiner

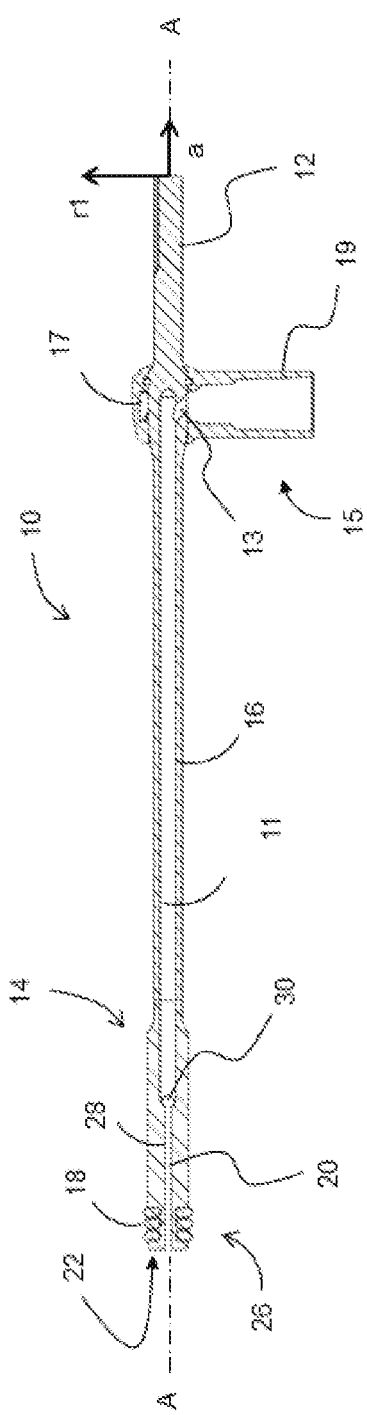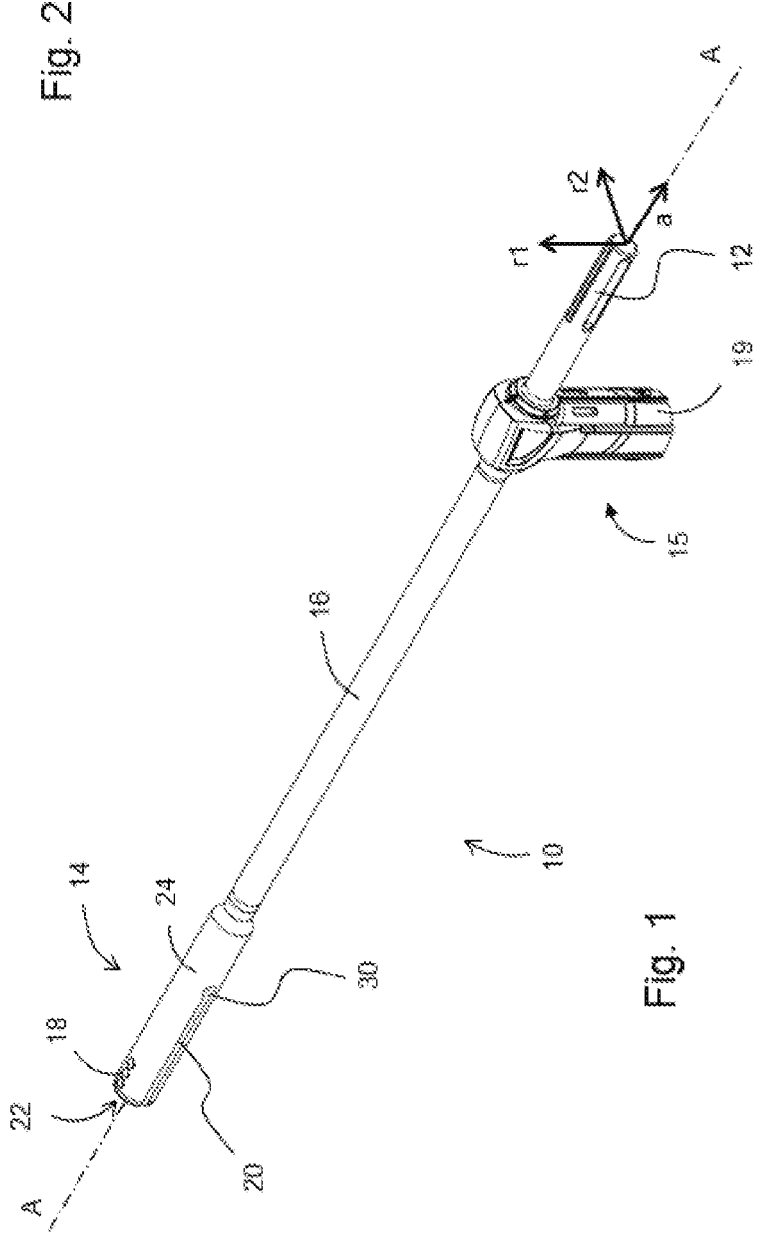

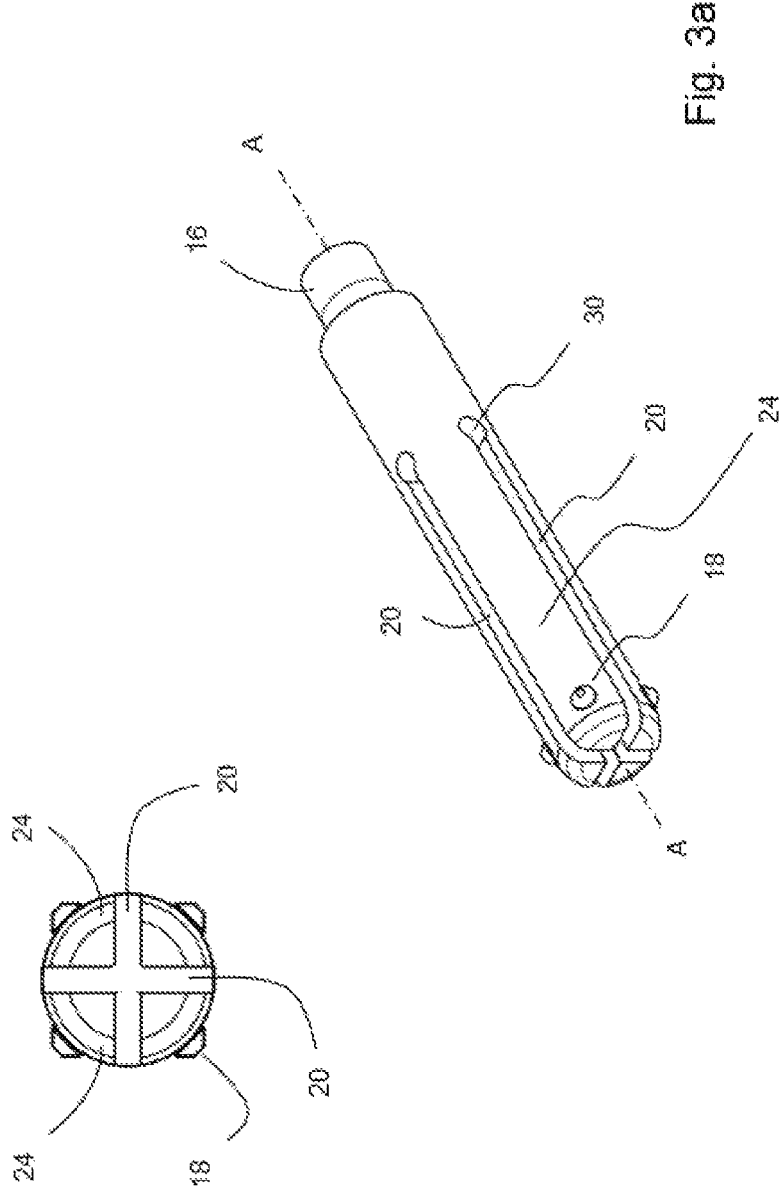

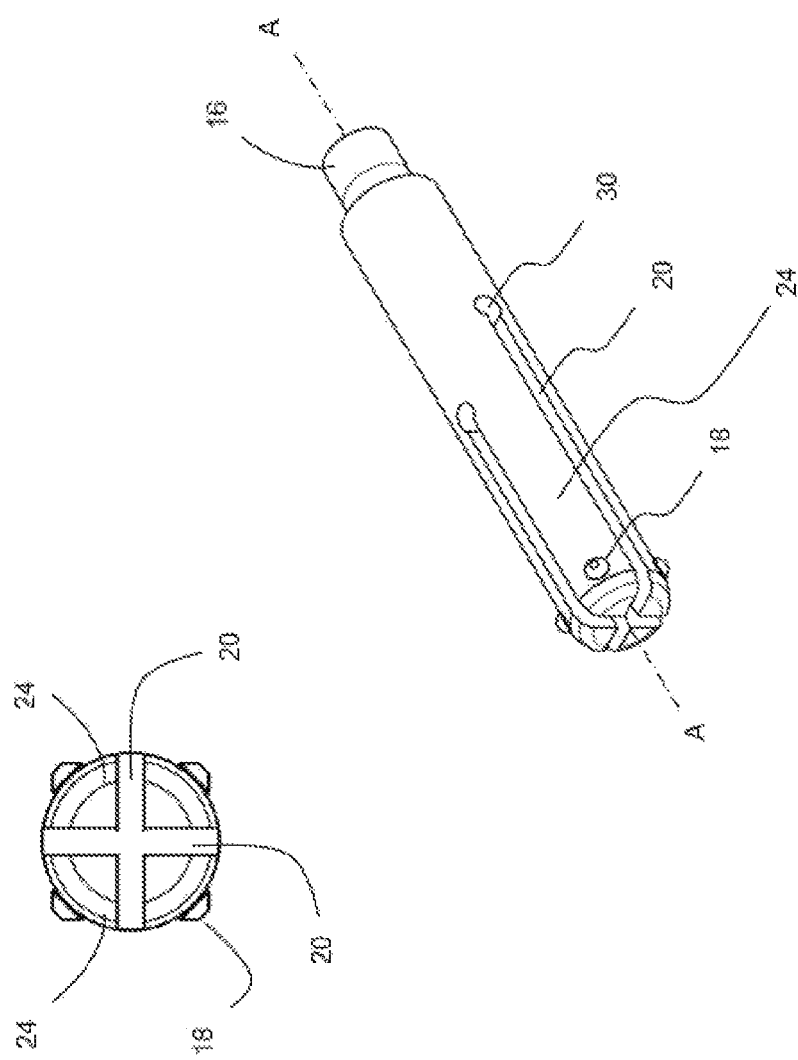

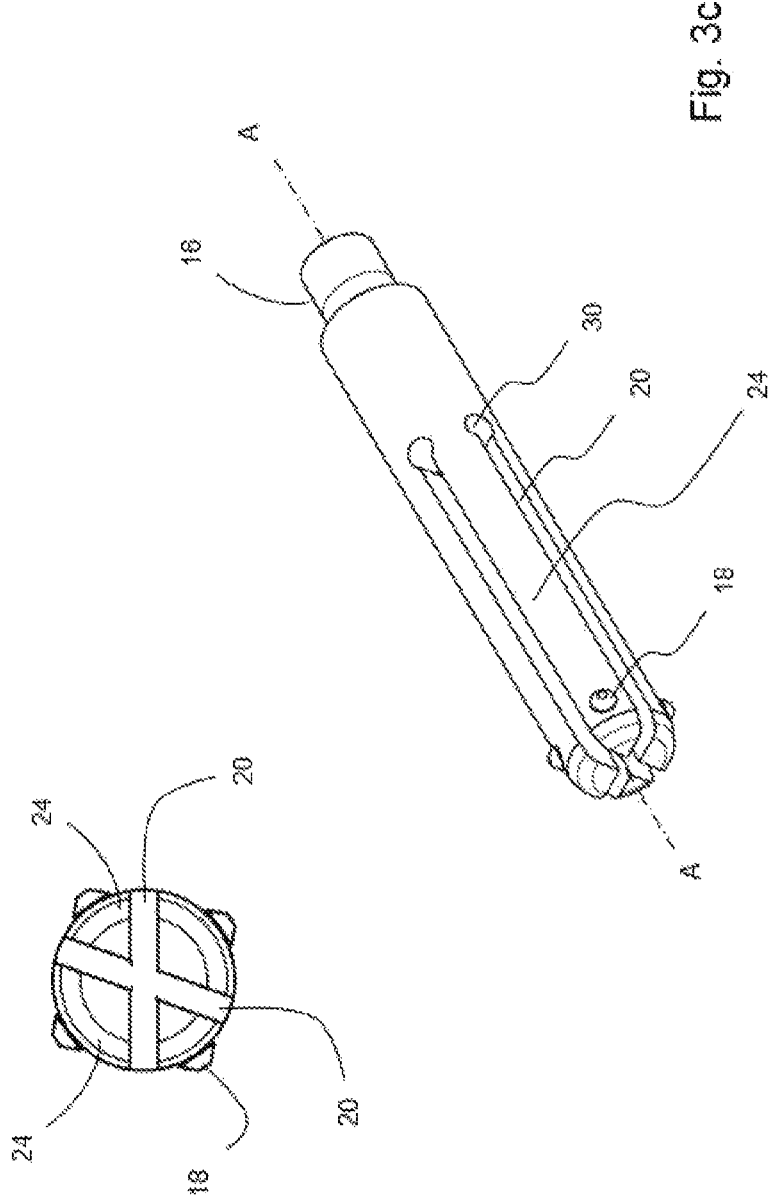

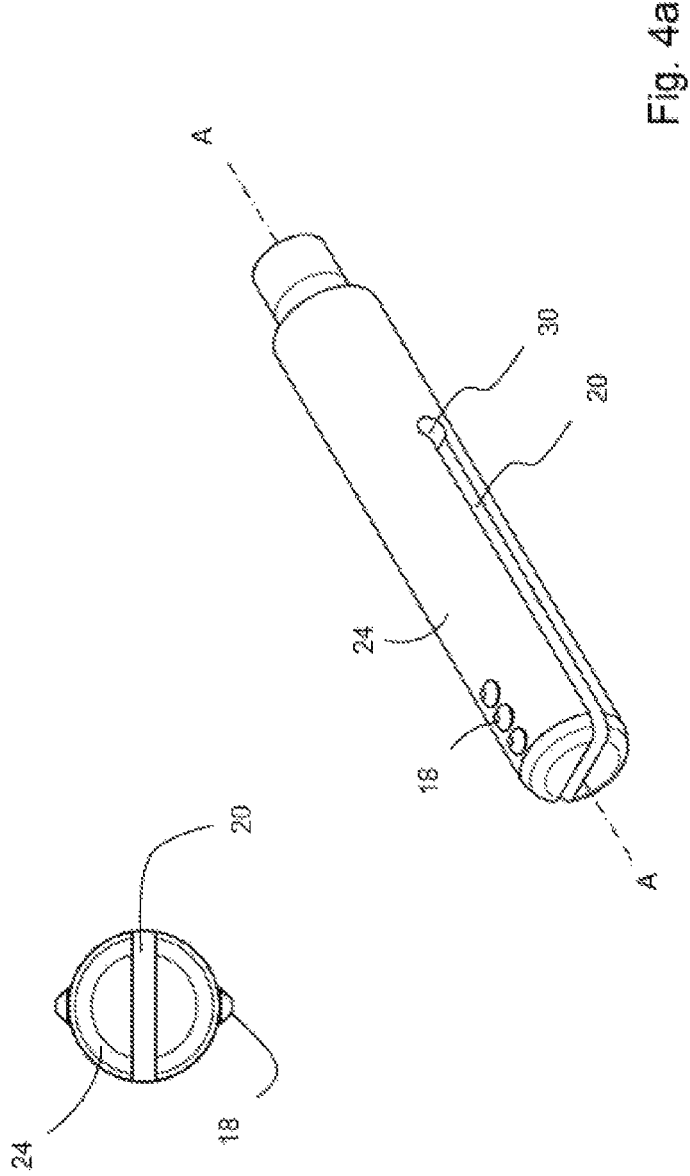

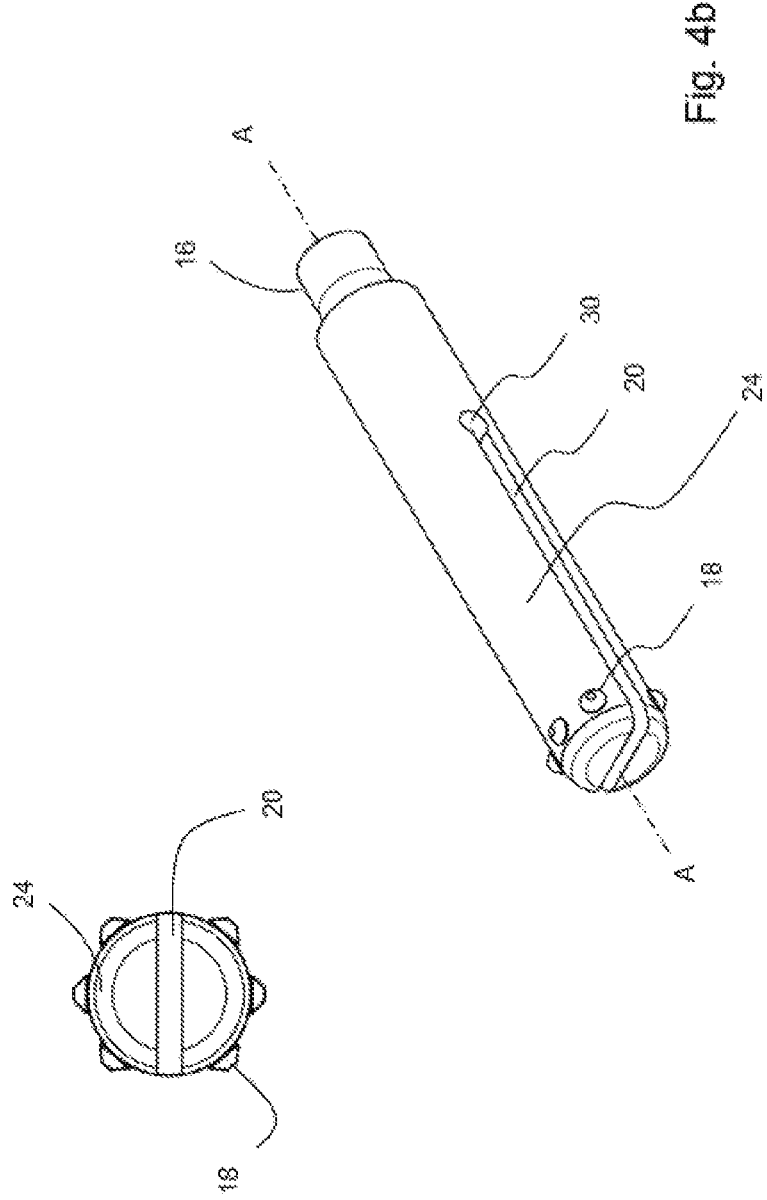

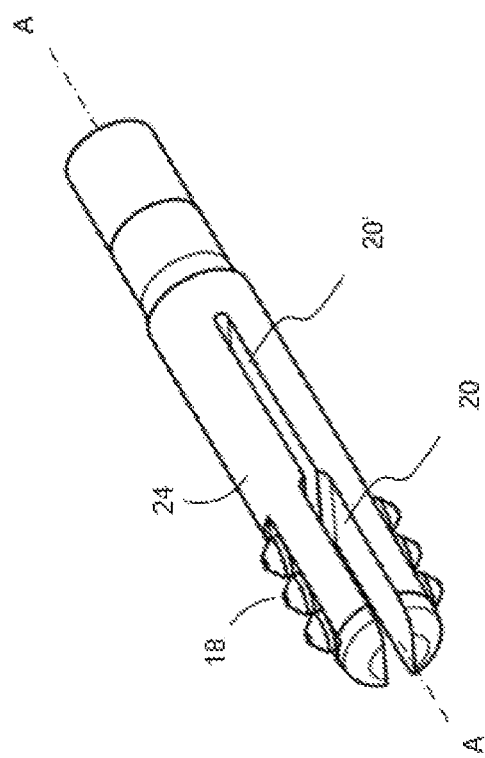

TOOL FOR ROUGHENING A BOREHOLE SURFACE

BACKGROUND OF THE INVENTION

The invention relates to a tool for roughening a borehole surface, with a coupling portion for clamping the tool in a drilling machine and a tool head for machining the borehole surface, wherein the coupling portion (12) is disposed at a first end of a tool shank (16) and the tool head (14) at an opposite, second end of the tool shank (16) and wherein cutting means disposed circumferentially on the tool head are provided.

For fastening building parts to foundations, it is known to fix profiled anchor bars by means of a chemical mortar compound in blind holes already drilled into the foundation. The blind holes can be drilled by means of diamond-surfaced tools. Depending on the material of the foundation, the borehole wall of such a borehole may be very smooth. In order to transfer even high tensile forces acting on the anchor bars reliably to the foundation, it is of advantage when the mortar compound in the cured condition interacts interlockingly with the borehole wall. This can be achieved by mechanically roughening at least part of the borehole wall or by providing it with profiling.

Tools and methods of the type mentioned in the introduction for roughening a borehole surface are therefore used in particular to increase the load-bearing capacity of chemical mortar compounds in diamond-drilled holes. In the process, the relatively smooth inner shell surface of a borehole is structured and, for example, provided with defined undercuts.

Various concepts are known for introducing such undercuts in a borehole surface. For example, DE 31 43 462 A1 and DE 38 19 650 A1 respectively describe tools on the tool shank of which a conical or cambered contact face is provided, to enable a user to superpose a wobbling motion manually on the tool rotation. In this way, the tool head is deflected in radial direction and penetrates into the borehole surface.

Furthermore, it is known from DE 103 34 150 A1 how to dispose a tool head eccentrically on a tool shank and in this way to achieve radial deflection of the cutters disposed circumferentially on the tool head.

DE 196 10 442 A1 proposes an asymmetric arrangement of tool cutters, so that the tool has an imbalance that generates a wobbling motion during drilling operation.

The already known solutions suffer from the disadvantage that both the operator and the drilling machine are greatly stressed by vibrations due to the wobbling motion of the tool. In addition, the result of the roughening process depends on the duration of application as well as on the machine guidance by the respective user. Furthermore, the cutting elements normally used for roughening, such as carbide or diamond cutting members, are exposed to severe wear, especially when they encounter rebar or hard rock during the roughening process.

Furthermore, the problem exists that drilling dust produced during the roughening process may prevent the roughening from achieving the desired quality. Thus the drilling dust may accumulate at the borehole bottom of a blind hole, and so the chemical mortar compound introduced into the borehole cannot be distributed over the full depth. In addition, the drilling dust may become smeared over the already roughened borehole wall, and thus may lead to smoothing of the roughness depth generated in the region of the borehole wall.

Against this background, the technical problem underlying the present invention is to specify, for roughening the surface of a borehole, a tool that does not exhibit the disadvantages described in the foregoing or at least exhibits them to a lesser extent, and in particular permits roughening of a borehole surface reliably, wherein the influence of the user is minimized and at the same time the comfort of application is increased.

SUMMARY OF THE INVENTION

The technical problem described in the foregoing is solved by a tool for roughening a borehole surface, with a coupling portion for clamping the tool in a drilling machine and a tool head for machining the borehole surface, wherein the the coupling portion is disposed at a first end of a tool shank and the tool head at an opposite, second end of the tool shank and wherein cutting means disposed circumferentially on the tool head are provided. The tool head has at least one slit that passes through from one side to the other and, starting from an end face of the tool head, extends axially along the longitudinal axis of the tool. In addition, the tool has an extraction duct extending at least partly axially along the longitudinal axis of the tool for extraction of drilling dust, wherein the extraction duct, starting from the end face of the tool head, extends inside the tool shank and discharges circumferentially into a connecting opening in the tool shank. The connecting opening may be, for example a bore oriented transversely, especially obliquely, relative to the longitudinal axis of the tool.

By the fact that the tool head is slit in axial direction at the end face, the tool head is subdivided into freely projecting arms, which are able to be resiliently deflected radially inward. This resilient radial inward deflection of the tool head permits introduction into a borehole. The circumferentially disposed cutting means may therefore be pressed in resiliently elastic manner in radial direction against the borehole surface to be roughened. In this way, by introducing the tool into a borehole, it is possible to generate, between the tool and the borehole surface, a radial preload force, which causes the cutting means to penetrate into the borehole surface during rotation of the tool. The radial cutting forces are therefore generated by a resiliently elastic preload, without necessitating a wobbling motion or eccentric motion of the tool. Thus the user merely has to execute a translatory movement of the tool corresponding to a drilling process. Consequently, the vibrations of the tool during the roughening process can be minimized. In addition, the wear of the cutting means can be reduced by the radial elasticity of the tool head. Thus the cutting means are able to avoid collision structures such as rebar or hard rock during the roughening process, by the fact that the cutting means are forced or resiliently deflected in a direction facing radially inward upon contact with these materials.

In particular, the circumferentially disposed cutting means describe an envelope circle, the diameter of which is larger than the nominal diameter of the borehole to be machined. During introduction of such a tool into the respective borehole, the arms with their circumferentially disposed cutting means are forced by the borehole surface in a direction facing radially inward, so that the slit of the tool head is narrowed. In this case, the preload of the tool depends only on the dimensions of the tool and the nominal diameter of the borehole. Thus a defined, radial preload of the tool can be generated.

Via the extraction duct, the drilling dust being produced can already be extracted from the borehole during the roughening process. In this way, accumulation of drilling dust in the borehole bottom of a blind hole as well as smearing of the roughened borehole surface by drilling dust can be prevented. Since the slits merge into the extraction duct, the slits may be regarded as part of the extraction duct.

In order to influence the extraction properties of the tool and to adapt them appropriately to the borehole dimensions, especially the borehole depth, and to improve the cleaning, the extraction opening on the tool head may be varied.

Optimum extraction behavior of the tool is achieved by direct extraction of the drilling dust at the point of production, meaning at the top end of the tool head, i.e. at the top end of the tool in the region of the cutting means. In order to position the extraction airflow in the region of the cutting members, longitudinal bores may discharge from the end face of the tool head into the longitudinal bore of the shank and thus transport the drilling dust from the top end of the tool through the tool shank to the extraction nozzles.

A further option for positioning the extraction at the end face consists in lengthening the longitudinal bore through the tool head by way of a conveying means, such as a tube or the like, through the slit to the top end of the tool head. In this way, the extraction of drilling dust in the immediate vicinity of the cutting means is ensured, specifically independently of the length of the tool head and thus of the slit length as well as the slit width. The conveying means must be flexible and thermally stable, in order not to prevent the movement of the arms upon introduction into the borehole. Furthermore, the conveying means must have a sufficiently large diameter, in order not to prevent extraction of the drilling dust and of any drilling cuttings that may be produced. Thus the intake of air through the sides of the slits, which especially in the case of broader and longer slits may cause little drilling dust to be extracted, is prevented, and the airflow is positioned at the top end of the tool head. Alternatively, further options of keeping the slit flexible and nevertheless sealed are conceivable. According to the invention, a tool is therefore specified that permits roughening of a borehole surface reliably, wherein the influence of the user is minimized and at the same time the comfort of application is increased.

Further configurations of the inventive tool are apparent from the dependent claims and the description of preferred exemplary embodiments.

An improvement of the inventive tool may be achieved by providing an adapter, which circumferentially surrounds the tool shank in the region of the connecting opening and which has a connecting nozzle for connecting an extraction device, wherein the adapter has a cavity, which circumferentially surrounds the shank in the region of the connecting opening, so that a junction for removal of drilling dust is formed between the connecting opening and the connecting nozzle. By means of the adapter, therefore, the tool can be interfaced simply with an extraction device. The cavity surrounding the shank circumferentially in the region of the connecting opening ensures that extraction in the region of the tool head can take place at any time during rotation of the tool shank. The drilling dust can be fed via the slit or slits to the extraction duct both at the end face and laterally.

According to an advantageous configuration, the tool shank is mounted to rotate in the adapter, wherein the tool is sealed, especially toward the environment. Extraction may then take place in such a way during the roughening process that the shank of the tool rotates relative to the adapter, whereas the adapter itself is stationary. The fact that the tool is sealed permits safer collection of the drilling dust, in which case contamination of the environment is prevented.

According to one configuration of the tool, the tool head may have at least two radially resilient arms, which extend along the slit and at their free end portions adjacent to the end face carry the circumferentially disposed cutting means. Due to the arrangement of the cutting means close to the end face, resilient deflection of the arms in the direction of the longitudinal axis of the tool is favored and the borehole is roughened as far as the end. In particular, the axial longitudinal extent of the slit may correspond to a multiple of the axial longitudinal extent of the free end portion, on which the cutting means are disposed. The further the slit reaches in axial direction into the tool head, the greater is the leverage supplied by the arms, and so resilient deflection, in radially inward direction, of the cutting means disposed in the region of the end portions is facilitated.

According to an improvement of the tool, the tool head may have at least two mutually intersecting slits that extend, starting from an end face of the tool head, axially along the longitudinal axis of the tool. Consequently, the tool head may have four arms extending along the slits and respectively carrying the cutting means circumferentially. The radial elasticity of the tool increases with the number of slits, and so the tool can be introduced particularly easily into a borehole. According to a further configuration of the invention, a multiplicity of mutually intersecting slits may be provided in the region of the tool head.

In order to achieve a different penetration depth of the circumferential cutting means during the roughening process, a first slit may have a greater length along the longitudinal axis of the tool than a second slit.

The slits of the tool head may intersect one another at an angle smaller than or equal to 90°. In particular, therefore, the slits may extend through the tool head substantially perpendicular to one another. Alternatively, to adapt the radial stiffness of individual arms, an angular position of the slits deviating from 90° may be provided, so that the arms have different cross sections. For example, if two slits include an angle smaller than 90°, four arms are formed. In this case a first pair of arms disposed opposite one another in pairs has a smaller wall thickness than a second pair of arms disposed next to these arms. In this way, the radial stiffness of the arms and consequently the depth of penetration of the cutting members during the roughening process can be adjusted.

According to a further construction, the tool is configured symmetrically. In particular, the tool may be constructed in such a way that the tool has homogeneous radial stiffness, so that dynamic loads during the roughening process or imbalance due to preloading of the tool are avoided. Thus at least two arms may be formed with point symmetry relative to a longitudinal axis of the tool. Alternatively or additionally, at least two arms may be formed with mirror symmetry relative to a plane of the tool, wherein the longitudinal axis of the tool lies in the plane of the tool. In particular, a slit may be made in such a way in the tool that at least two arms have substantially parallel flat planes facing one another.

For optimum functionality of the inventive tool, it may be necessary to configure the slits variably over the length. The slit width at the top end of the tool head is preferably dimensioned such that the two arms just do not touch one another at maximum necessary resilient inward deflection of the cutting means. Thus the slit width depends on the nominal diameter of the borehole for which the inventive tool is to be used. The dimensioning of the slit width at the opposite end of the slit, i.e. at the bottom of the slit facing away from the end face of the tool head, defines the spring stiffness of the arms and may necessarily be dimensioned smaller than the necessary slit width at the top end of the tool head. This may be permitted, for example, via a step change in the slit profile. According to one construction of the inventive tool, the slit, starting from the top end of the tool head, has a greater width over a region in the direction of the longitudinal axis of the tool than over the connecting region in the direction of its bottom facing away from the front end. A tool configured in such a way is suitable in particular for small borehole diameters.

According to an improvement of the inventive tool, the slit may have a concave rounding at its bottom facing away from the end face. This rounding may be formed by a through bore made in the tool head, especially transversely relative to the longitudinal extent of the slit. By means of the rounding, a notch effect in the region of the bottom of the slit is reduced and the spring stiffness or the force of pressing of the cutting means against the borehole wall is adjusted.

The cutting means of the tool may comprise at least two radially extending carbide and/or diamond pins pointing away from the longitudinal axis of the tool. Preferably, the pins each form one geometrically specific cutter, thus permitting well-defined introduction of furrows or undercuts in the borehole surface. Thus it is possible to make the pins used from a hard material and the arms from an elastic material. At their radial outer ends, the pins have especially a frustoconical or hemispherical shape.

According to an improvement of the inventive tool, a multiplicity of carbide and/or diamond pins are provided, which are distributed in axial direction and/or circumferentially on the tool head. For example, an arm may carry one single or a multiplicity of carbide pins. The carbide pins may be distributed circumferentially on the arm or be disposed axially one after the other along the longitudinal direction of the tool. For example, two or more, especially three carbide pins may be provided on one arm. The carbide pins may be densely packed in axial direction or disposed closely adjacent to one another in an end portion of the arm associated with the end face. Alternatively or additionally, the carbide pins may be disposed on an outer shell surface of the arm at the same axial height but distributed circumferentially with an angular spacing from one another.

According to a further configuration of the tool, the tool head may have substantially circular cylindrical shape. The diameter of the outer shell surfaces bounding the cylinder in radial direction is preferably smaller than the nominal diameter of a borehole to be machined. Preferably, carbide and/or diamond pins disposed on the outer shell surface and pointing outwardly in radial direction define the maximum diameter of the tool, wherein the diameter of an envelope circle defined by the carbide or diamond pins is in particular larger than the nominal diameter of the borehole to be machined. By the introduction of one or more slits in the end face, the cylindrical tool head can be subdivided into several arms, the outer shell surfaces of which describe circular segments, such as semicircles or quarter circles, in a section transverse to the longitudinal axis of the tool. In the region of a slit, these arms may have flat faces facing one another.

In addition, an advantageous improvement of the tool may be specified to the effect that the tool shank is at least twice as long, preferably at least three times as long as the tool head in axial direction. With a tool configured in this way, even the machining of deeper boreholes is easily possible.

The diameter of the tool shank may be smaller than the diameter of the tool head. In this way, the tool can be configured to be lightweight and flexible, wherein the handling during operation is improved on the whole.

According to an improvement of the inventive tool, the slit is filled at least in portions with an elastic filling material, especially an elastomer, in order to increase the radial preload forces during operation of the tool. The radial stiffness of the tool head can be increased by the filling material. Furthermore, the filling material can be used to damp vibrations or oscillations during machining of the borehole surface.

The extraction duct may be formed in the tool head by the at least one slit and in axial direction downstream from the slit by a bore, which is coupled with the slit or slits. Alternatively, the extraction duct may be formed by a bore, which extends to the end face and into which at least one slit discharges radially.

When several slits are present, the slit, preferably all slits, preferably extend linearly and furthermore through the center axis of the tool.

According to a further configuration of the inventive tool, a geometrically determined cutting geometry, especially in the manner of a drill, is provided in addition to the circumferential cutting means in the region of the tool head. Thus the end face of the tool head may have a drill tip split or slit axially along the longitudinal direction of the tool. In particular, two arms, which respectively carry cutting means circumferentially in the region of an outer shell surface, may respectively form a cutting wedge at the end face. In this way, axial penetration of the tool can be facilitated, especially in the region of a borehole bottom. The cutting edge may be formed by a cutting plate attached to the arm or by the arm itself.

The nominal diameter of the borehole may preferably be smaller than the diameter of an envelope circle defined by the circumferential cutting means. In such a case, the tool is elastically braced resiliently in radial direction when the tool is introduced into the borehole, wherein the slit of the tool is narrowed. During rotation of the tool, these bracing forces cause the cutting means to penetrate into the borehole surface while roughening the borehole surface. In the process, the operator is able to introduce undercuts into the borehole surface by executing a purely translatory movement of the tool along a longitudinal axis of the borehole.

Starting from a borehole bottom, the borehole surface can be roughened over the entire length measured in axial direction. In this case there is no need for a subsequent cleaning treatment of the borehole, for example by flushing or blowing out, since the drilling dust formed during the roughening process is directly extracted.

The invention will be described in more detail hereinafter on the basis of a drawing that schematically illustrates exemplary examples, wherein:

BRIEF DESCRIPTION OF THE DRAWINGS

FIG. 1 shows a configuration of an inventive tool in a perspective view;

FIG. 2 shows the inventive tool from FIG. 1 in a sectional view;

FIGS. 3*a*-3*c* show variants for arrangement of the slits in the region of the tool head in perspective and front views;

FIGS. 4*a*, 4*b* show variants for arrangement of carbide pins in the region of the tool head; FIG. 6 shows a configuration of the tool head with a step change in the slit profile.

DETAILED DESCRIPTION

Figure 5:
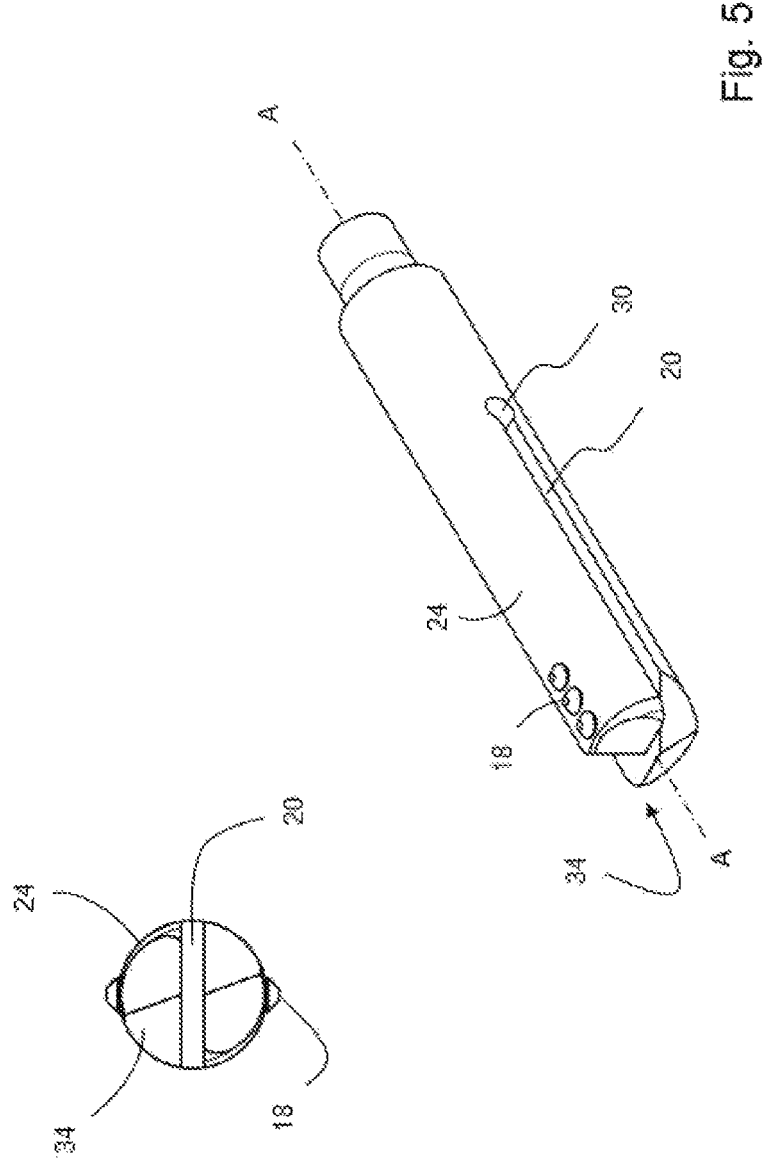
FIG. 5 shows a configuration of the tool head with a cutting geometry

FIG. 1 shows a configuration of a tool 10 for roughening a borehole surface.

Tool 10 has a coupling portion 12 for clamping tool 10 in a drilling machine (not illustrated), a tool head 14 for machining a borehole surface (not illustrated) and a tool shank 16 joining a coupling portion 12 and tool head 14. Coupling portion 12 is disposed at a first end and tool head 14 at a second end, opposite the first end, of tool shank 16.

Tool shank 16 is more than twice as long as tool head 14 along an axial direction a. The diameter of tool shank 16 corresponds to that of coupling portion 12 and is smaller than the diameter of tool head 14.

Tool head 14 is substantially cylindrical and has circumferentially disposed, radially protruding carbide pins 18. Carbide pins 18 are facing radially outward and extend in a radial direction r1 transverse to axial direction a.

Tool head 14 has a slit 20 which, starting from an end face 22 of tool head 14, extends axially along longitudinal axis A of the tool as well as laterally from one to an opposite shell-surface portion, meaning that it passes though from one side to the other and divides tool head 14.

Thus tool head 14 has two arms 24 extending along slit 20. At their free end portions 26 adjacent to end face 22, arms 24 carry circumferential carbide pins 18.

As an example, three carbide pins 18 disposed adjacent to one another in axial direction are provided on each arm 24. It will be understood that diamond pins may be provided alternatively or additionally as cutting means.

Arms 24 are configured with mirror symmetry relative to a plane defined by axial direction a and radial direction r2. Arms 24 have flat faces 28, which face one another and are disposed with constant spacing from one another. In other words, slit 20 has a substantially constant gap width.

At its bottom facing away from end face 22, the slit has a concave rounding 30. Rounding 30 is a radial through-bore.

For roughening a borehole surface, tool 10 is introduced with its tool head 14 into a borehole. For this purpose, tool 10 is clamped with coupling portion 12 in a drilling machine. The nominal diameter of the borehole is smaller than the diameter of an outer envelope circle of tool 10 defined by carbide pins 18. During introduction of tool head 14 into the borehole, carbide pins 18 are therefore forced radially inward by the borehole surface, in the direction of longitudinal axis A of the tool. In this way, slit 20 is narrowed. In this condition, carbide pins 18 bear on the borehole surface and are resiliently braced elastically against the borehole surface via arms 24, which are elastically bent inwardly.

Rotation of the tool imposed by the drilling machines causes carbide pins 18 to penetrate into the borehole surface and introduce furrows or undercuts in the borehole surface. The borehole may be a blind hole.

For roughening the borehole surface, tool 10 merely has to be introduced by translation along longitudinal axis A of the tool into the borehole. The radial cutting forces are achieved solely by the resiliently elastic preload of tool head 14, and so no radial force has to be transmitted into tool 10 by the user.

FIG. 2 shows inventive tool 10 in a sectional view. Tool 10 has an extraction duct 11, extending axially along longitudinal axis A of the tool, for extraction of drilling dust. Starting from end face 22 of tool head 14, extraction duct 11 extends inside tool shank 16, wherein it is formed in this region by slit 20. The slit discharges into a central bore 40 (here a blind hole), which extends close to coupling portion 12. A radial connecting opening 13 discharges circumferentially into bore 40.

An adapter 15 circumferentially surrounding tool shank 16 is provided in the region of connecting opening 13.

Adapter 15 has a cavity 17 and a connecting nozzle 19. Connecting nozzle 19 is provided for connection of an extraction device (not illustrated). Cavity 17 circumferentially surrounds shank 16 in the region of connecting opening 13. In this way, a junction for removal of drilling dust is formed between connecting opening 13 and connecting nozzle 19. Tool shank 16 is mounted to rotate in adapter 15.

Tool 10 is sealed relative to the environment.

During the roughening process, tool shank 16 driven via a drilling machine rotates inside adapter 15, which is stationary. During the process, an extraction device is connected to connecting nozzle 19. Due to cavity 17, it is ensured that extraction during rotation of tool shank 16 is possible at any angular position. The drilling dust can be fed via slit 20 to extraction duct 11 both at the end face and laterally.

Alternatively to the embodiment illustrated in FIG. 2, bore 40 may also extend up to end face 22, so that here a bore with uniform cross section is present. Slit or slits 20 then discharge radially into this central bore 40.

Various exemplary embodiments of tool head 14 will be shown hereinafter on the basis of FIGS. 3 to 5. In each case, the illustrations of tool heads 14 are to be understood as merely examples. It will be understood that, for each of the shown variants, slits 20 discharge or merge in axial direction into extraction duct 11, so that extraction of drilling dust in the region of the tool head is made possible. In particular, slits 20 may be regarded as part of extraction duct 11.

FIGS. 3a to 3c illustrate three different variants for arrangement of slits 20 in the region of tool head 14. FIG. 3a shows a tool head 14 in a perspective view and a front view. Tool head 14 has two slits 20 that intersect one another in the center axis of the tool, so that four arms 22 in total are formed, each carrying one carbide pin 18. Tool head 14 has symmetrical structure.

FIG. 3b likewise shows a tool head 14 with two mutually intersecting slits 20, but wherein one of the slits 20 has a greater length along the longitudinal axis of the tool than does the other slit.

FIG. 3c shows a further variant of a tool head 14, which differs from the variants described in the foregoing in that slits 20 do not pass through tool head 14 at right angles but instead are oriented obliquely relative to one another. Arms 24, disposed opposite to one another in pairs, therefore have different wall thicknesses and cross sections, as can be inferred from the front view.

FIGS. 4a and 4b show variants for arrangement of carbide pins 18 in the region of tool head 14. FIG. 4a shows an axial arrangement of the carbide pins, while FIG. 4b represents a circumferential distribution, in which the carbide pins are disposed with angular spacing from one another relative to the longitudinal axis of the tool.

FIG. 5 shows a configuration of tool head 14 with a cutting geometry 34. Arms 24 are shaped at the end face in the manner of a drill, wherein a drill tip split by slit 20 is formed along longitudinal axis A of the tool.

Naturally, tool head 14 may be manufactured separately and mounted on the shank detachably or permanently.

FIG. 6 shows a configuration of tool head 14 with a step change in the slit profile, so that slit 20, 20' has a different slit width along longitudinal axis A of the tool, wherein the slit, starting from the top end of the tool head, has a greater width over a region (slit 20) in the direction of the longitudinal axis of the tool than over the connecting region (slit 20') in the direction of its bottom facing away from the front end. Due to the broader slit region 20, arms 24 at the end of the tool head are able to be deflected resiliently inward sufficiently, corresponding to the borehole diameter, in the direction of longitudinal axis A of the tool, especially in the case of small borehole diameters, wherein the spring force is adjusted by the narrower slit 20'.

The invention claimed is:

1. A tool for roughening a borehole surface, the tool comprising:
    a coupling portion for clamping the tool in a drilling machine;
    a tool head for machining the borehole surface; and
    an extraction duct, wherein the coupling portion is disposed at a first end of a tool shank and the tool head at an opposite, second end of the tool shank, and wherein the tool head comprises at least one cutter with solid radial extensions disposed on a circumferential surface of the tool head and arranged to cut in a direction pointing away from a longitudinal axis of the tool,
    wherein the tool head has at least one slit which discharges into the extraction duct, the at least one slit passing through from one side to another side of the tool head and, starting from an end face of the tool head, extends axially along the longitudinal axis of the tool,
    wherein the extraction duct extends at least partly axially along the longitudinal axis of the tool for extraction of drilling dust, and
    wherein the extraction duct, starting from the end face of the tool head, extends inside the tool shank and discharges circumferentially into a connecting opening in the tool shank.

2. The tool according to claim 1, which further comprises:
    an adapter, which circumferentially surrounds the tool shank in the region of the connecting opening and which has a connecting nozzle for connecting an extraction device, wherein the adapter has a cavity, which circumferentially surrounds the tool shank in the region of the connecting opening, so that a junction for removal of drilling dust is formed between the connecting opening and the connecting nozzle.

3. The tool according to claim 2, wherein the tool shank is mounted to rotate in the adapter, and wherein the tool is sealed.

4. The tool according to claim 2,
    wherein the tool shank is mounted to rotate in the adapter, and
    wherein the tool is sealed toward the environment.

5. The tool according to claim 1, wherein the tool head has at least two radially resilient arms, which extend along the slit and at free end portions adjacent to the end face carry the cutter.

6. The tool according to claim 1, wherein the tool head comprises at least two mutually intersecting slits that extend, starting from an end face of the tool head, axially along the longitudinal axis of the tool.

7. The tool according to claim 6, wherein a first slit has a greater length along the longitudinal axis of the tool than a second slit.

8. The tool according to claim 6, wherein the slits intersect one another at an angle smaller than or equal to 90°.

9. The tool according to claim 1, wherein the tool is configured symmetrically at least in portions.

10. The tool according to claim 1, wherein, at its bottom facing away from end face, the slit has a concave rounding.

11. The tool according to claim 1, wherein the cutter comprises at least two carbide and/or diamond pins corresponding to the radial extensions and pointing radially away from the longitudinal axis of the tool.

12. A tool according to claim 11, wherein the tool shank has a diameter smaller than that of the tool head.

13. The tool according to claim 1, wherein the tool head is substantially cylindrical and/or has a cambered outer contour.

14. The tool according to claim 1, wherein the tool shank is at least twice as long as the tool head in axial direction.

15. The tool according to claim 1, wherein the extraction duct is formed in the tool head by the at least one slit and in axial direction downstream from the slit by a bore, or in that the extraction duct is formed by a bore, which extends to the end face and into which the at least one slit discharges radially.

16. The tool according to claim 1, wherein a geometrically determined cutting geometry, is provided in the region of the tool head, in addition to the cutter.

17. The tool according to claim 1, wherein the at least one slit has different widths along the longitudinal axis of the tool.

18. The tool according to claim 1, wherein the cutter comprises a multiplicity of carbide pins and/or diamond pins correspond to the radial extensions and which are distributed in axial direction and/or circumferentially on the tool head.

19. The tool according to claim 1, wherein the tool shank is at least three times as long as the tool head in axial direction.

20. The tool according to claim 1, wherein the at least one slit defines arms that deflect inwardly in a radial direction when the tool head is inserted into the borehole.

* * * * *